(12) United States Patent
Arling et al.

(10) Patent No.: US 6,629,077 B1
(45) Date of Patent: Sep. 30, 2003

(54) UNIVERSAL REMOTE CONTROL ADAPTED TO RECEIVE VOICE INPUT

(75) Inventors: Paul D. Arling, Irvine, CA (US); Patrick H. Hayes, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 372 days.

(21) Appl. No.: 09/721,092

(22) Filed: Nov. 22, 2000

(51) Int. Cl.[7] .............................................. G10L 21/06
(52) U.S. Cl. ...................................... 704/275; 704/270
(58) Field of Search ................................ 704/270, 274, 704/275; 348/734

(56) References Cited

U.S. PATENT DOCUMENTS

| | | | |
|---|---|---|---|
| 4,333,152 A | * | 6/1982 | Best ........................... 364/521 |
| 4,415,767 A | | 11/1983 | Gill et al. |
| 4,445,187 A | * | 4/1984 | Best ........................... 364/521 |
| 4,569,026 A | * | 2/1986 | Best ........................... 364/521 |
| 4,811,243 A | | 3/1989 | Racine |
| 4,896,358 A | | 1/1990 | Bahler et al. |
| 4,924,387 A | | 5/1990 | Jeppesen |
| 4,964,075 A | | 10/1990 | Shaver et al. |
| 5,023,912 A | | 6/1991 | Segawa |
| 5,054,074 A | | 10/1991 | Bakis |
| 5,065,390 A | | 11/1991 | Miyauchi et al. |
| 5,212,821 A | | 5/1993 | Gorin et al. |
| 5,231,380 A | | 7/1993 | Logan |
| 5,301,227 A | | 4/1994 | Kamei et al. |
| 5,321,801 A | | 6/1994 | Ando |
| 5,329,609 A | | 7/1994 | Sanada et al. |
| 5,406,261 A | | 4/1995 | Glenn |
| 5,408,536 A | | 4/1995 | Lemelson |
| 5,408,582 A | | 4/1995 | Colier |
| 5,426,450 A | | 6/1995 | Drumm |
| 5,500,643 A | | 3/1996 | Grant |
| 5,585,823 A | | 12/1996 | Duchon et al. |
| 5,600,781 A | | 2/1997 | Root et al. |
| 5,619,708 A | | 4/1997 | Ho |
| 5,621,436 A | | 4/1997 | Solhjell |
| 5,621,456 A | * | 4/1997 | Florin et al. ................... 348/7 |
| 5,627,530 A | | 5/1997 | Israel et al. |
| 5,659,665 A | | 8/1997 | Whelpley, Jr. |
| 5,874,939 A | | 2/1999 | Galvin |
| 5,959,751 A | | 9/1999 | Darbee et al. |
| 5,982,303 A | * | 11/1999 | Smith .......................... 341/22 |
| 6,003,072 A | | 12/1999 | Gerritsen et al. |
| 6,070,139 A | * | 5/2000 | Miyazawa et al. .......... 704/275 |
| 6,094,156 A | * | 7/2000 | Henty ......................... 341/176 |
| 6,188,985 B1 | * | 2/2001 | Thrift et al. ................. 704/275 |
| 6,397,186 B1 | * | 5/2002 | Bush et al. .................. 704/274 |
| 6,397,212 B1 | * | 5/2002 | Biffar ............................ 707/5 |
| 6,407,779 B1 | * | 6/2002 | Herz ........................... 348/734 |
| 6,553,178 B2 | * | 4/2003 | Abecassis ..................... 386/83 |

FOREIGN PATENT DOCUMENTS

JP    1-119821    5/1989

OTHER PUBLICATIONS

Hammacher Catalog, Nov. 2000, The Only Voice Activated Remote Control, p. 49.

* cited by examiner

*Primary Examiner*—Susan McFadden
(74) *Attorney, Agent, or Firm*—Mark R. Galis; Gary R. Jarosik

(57) ABSTRACT

A universal remote control adapted to receive a voice input. The voice input is received by the remote control and compared to a plurality of voice command templates that are stored in the memory of the remote control. If the voice input matches one or more of the plurality of voice command templates, a valid voice input has been received by the remote control. Valid voice input may be a remote control command or keystroke data, input as an entire word or as individual characters. In response to a valid voice input, the remote control may transmit an operational command code and/or alphanumeric symbol code corresponding to keystroke data to a consumer electronic device.

6 Claims, 7 Drawing Sheets

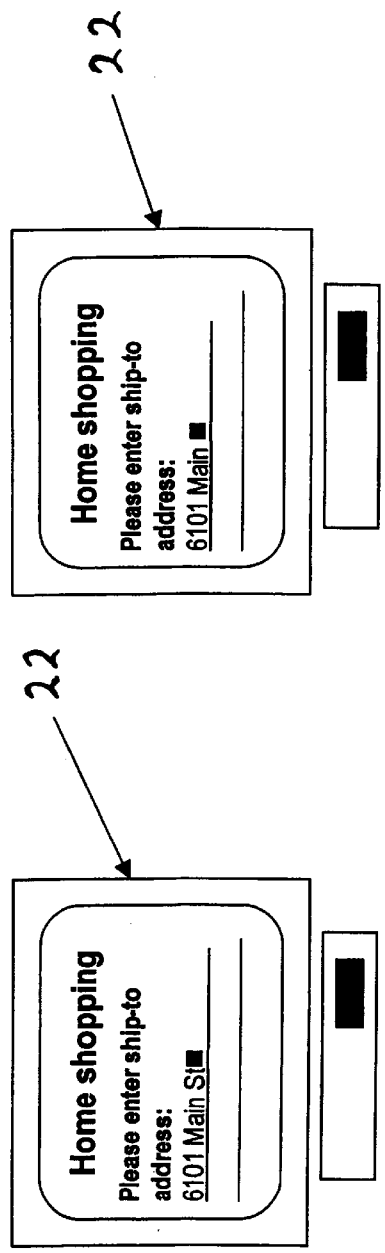
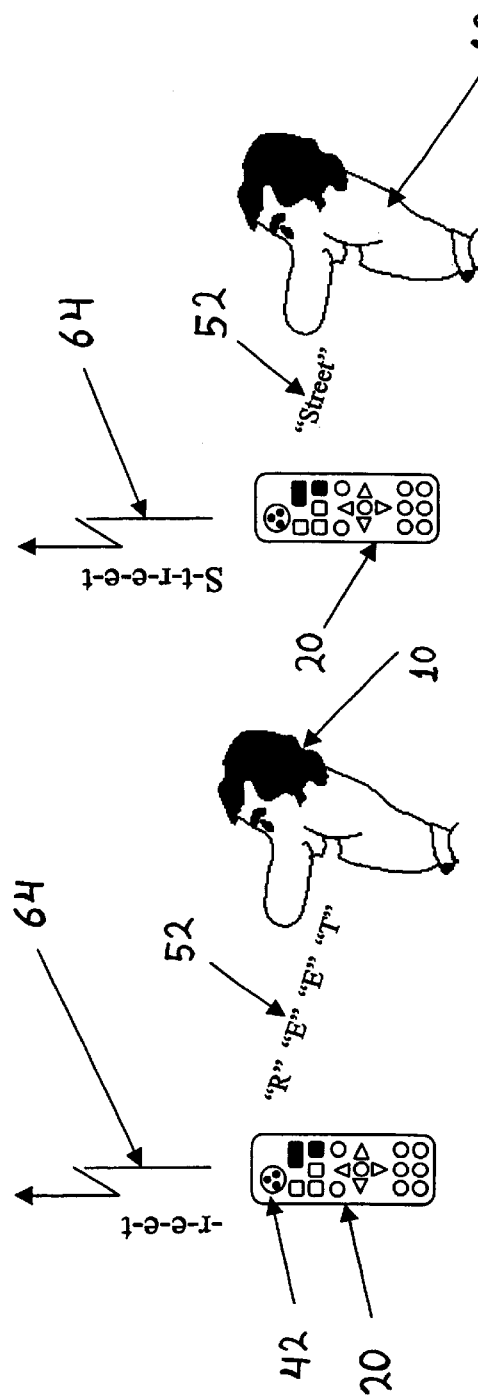
Figure 3
Remote control with letter-by-letter voice data entry
Figure 4
Remote control with phrase-by-phrase voice data entry

UNIVERSAL REMOTE CONTROL ADAPTED TO RECEIVE VOICE INPUT

BACKGROUND OF THE INVENTION

The present invention relates generally to universal remote control devices that are adapted to control the operation of consumer electronic devices and, more particularly, to a universal remote control that is adapted to recognize voice input for use in transmitting operational command codes and/or alphanumeric symbol codes representative of keystroke data to consumer electronic devices.

Universal remote controls capable of controlling the operation of consumer electronic devices are well known in the art. For example, U.S. Pat. No. 5,959,751 to Darbee et al., describes a universal remote control capable of controlling the operation of a plurality of different types of consumer electronic devices from a plurality of different manufacturers. Such a universal remote control is intended to primarily control the functional operations of the consumer electronic devices themselves. For example, to control the volume and channel tuning in a television; play, rewind and stop in a VCR; etc.

Currently, the home entertainment environment is expanding to include consumer electronic devices that are intended to communicate with other electronic devices via a network, such as the Internet, in support of on-line banking, shopping, and the like. To support this additional functionality, the consumer electronic devices typically require a user to enter keystroke data (i.e., alphanumeric and punctuation symbols collectively referred to hereinafter as "alphanumeric symbols.") Examples of keystroke data include, but are not limited to, credit card information, short email messages, delivery addresses for purchased items, Web site URLs, and the like.

For allowing users to transmit keystroke data to consumer electronic devices, it is known to provide a keyboard. By way of example, U.S. Pat. No. 4,964,075 to Shaver et al., U.S. Pat. No. 5,659,665 to Whelpley and U.S. Pat. No. 5,874,939 to Galvin each describe wired keyboards that include voice recognition capabilities. Shaver and Whelpley provide voice recognition features that are intended to be retrofitted to existing products. Galvin provides voice recognition features by incorporating a voice recognition module with a standard keyboard. While these keyboards are capable of transmitting keystroke data to the consumer electronic devices, keyboards suffer the disadvantage of being large, unwieldy, and more costly than most remote controls.

It is also known in the art to use touch screens as a means by which keystroke data is entered into a hand held device. For example, products such as Interlink's Freedom Writer® and products by IntuiTouch or the Palm Pilot family offer various forms of "graffiti" in which the outline of characters are traced on a touch sensitive surface, with either a finger tip or a stylus, thereby producing keystroke data on the touch sensitive surface. Universal Electronics Incorporated ("UEI") and Philips also market products that provide an LCD behind a touch sensitive surface which displays a mini-keyboard allowing users to select and enter keystroke data with a stylus, i.e., UEI's Mosaic® and Philips' Pronto®. While touch screens allow users to enter keystroke data, they suffer various disadvantages affecting user acceptability, including the need to enter multiple keystrokes for each character and the need for users to learn how to form the "graffiti" characters necessary to input keystroke data.

Yet another approach for entering keystroke data into a hand held device uses a standard telephone style numeric keypad labeled with letters of the alphabet. For example, the user enters each character as a pair of keystrokes—the first keystroke indicating which three (or four) character group is being selected and the second keystroke indicating which character within that group is desired. While this approach does provide a method for users to enter text data, using keypads in this manner is both time consuming and difficult.

SUMMARY OF THE INVENTION

To overcome the disadvantages noted above, the present invention is directed to a universal remote control that is capable of transmitting operational command codes and/or keystroke data to consumer electronic devices without requiring a separate keyboard, touch screen, or telephone style numeric keypad. More specifically, the universal remote control is adapted to recognize voice input for use in transmitting operational command codes and/or keystroke data to a consumer electronic device. In this manner, voice input may be used to cause the remote control to command the operation of consumer electronic devices while also allowing the user to transmit keystroke data, such as Web site addresses, to the consumer electronic devices.

In accordance with the described remote control, a voice input is received by the remote control which is compared to a plurality of voice command templates that are stored in the memory of the remote control. If the voice input matches one or more of the plurality of voice command templates, a valid voice input has been received by the remote control. Valid voice input may be a remote control command and/or keystroke data, input as an entire word or as individual characters. In response to a valid voice input, the remote control may transmit a corresponding operational command code and/or keystroke data to a consumer electronic device.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which:

FIG. 3 shows the remote control of FIG. 1 transmitting keystroke data to a consumer electronic device in response to a character-by-character voice input;

FIG. 4 shows the remote control of FIG. 1 transmitting keystroke data to a consumer electronic device in response to a word voice input.

DETAILED DESCRIPTION

Figure 1:
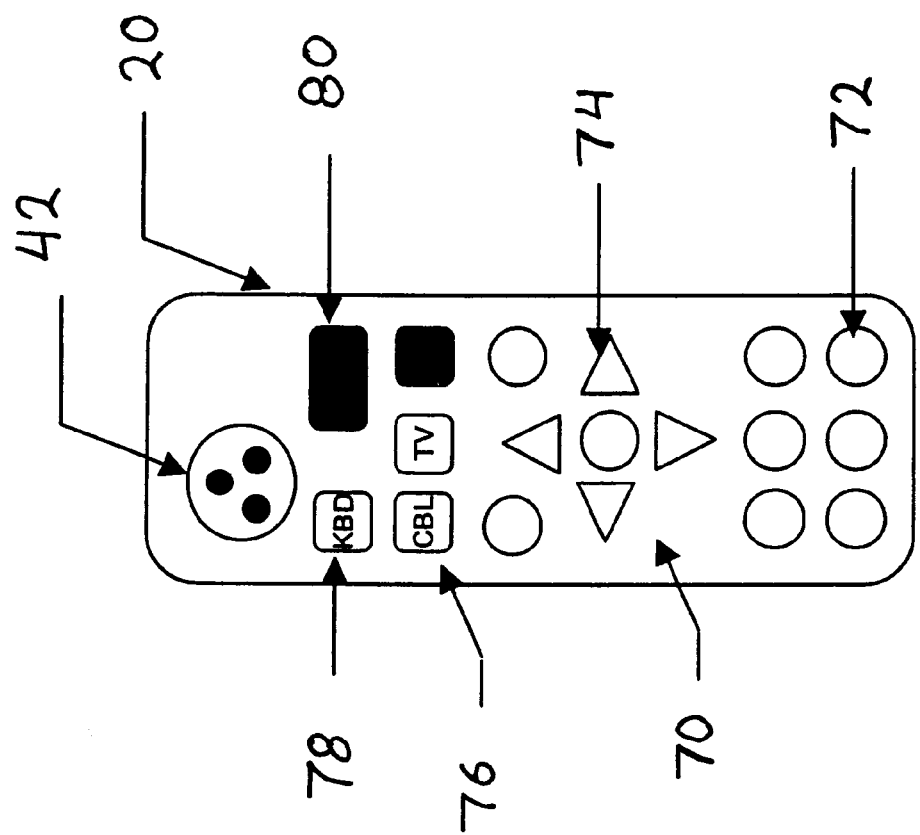
FIG. 1 shows an exemplary remote control for use in accordance with the subject invention.

Turning now to the figures, wherein like reference numerals refer to like elements, there is illustrated a remote control 20 adapted to transmit command codes, including operational command codes and alphanumeric symbol codes representative of keystroke data, to remotely controlled consumer electronic devices 22 in response to voice input. The ability to transmit keystroke data is particularly advantageous as it allows the remote control 20 to meet the need for users of keyboardless, electronic devices to navigate and engage in electronic business transactions on the Internet. As will be understood by those of ordinary skill in the art, the remote control 20 transmits signals to the consumer electronic devices 22 using any suitable wired or wireless transmission means using coding formats recognized by the consumer electronic devices 22.

Figure 2:
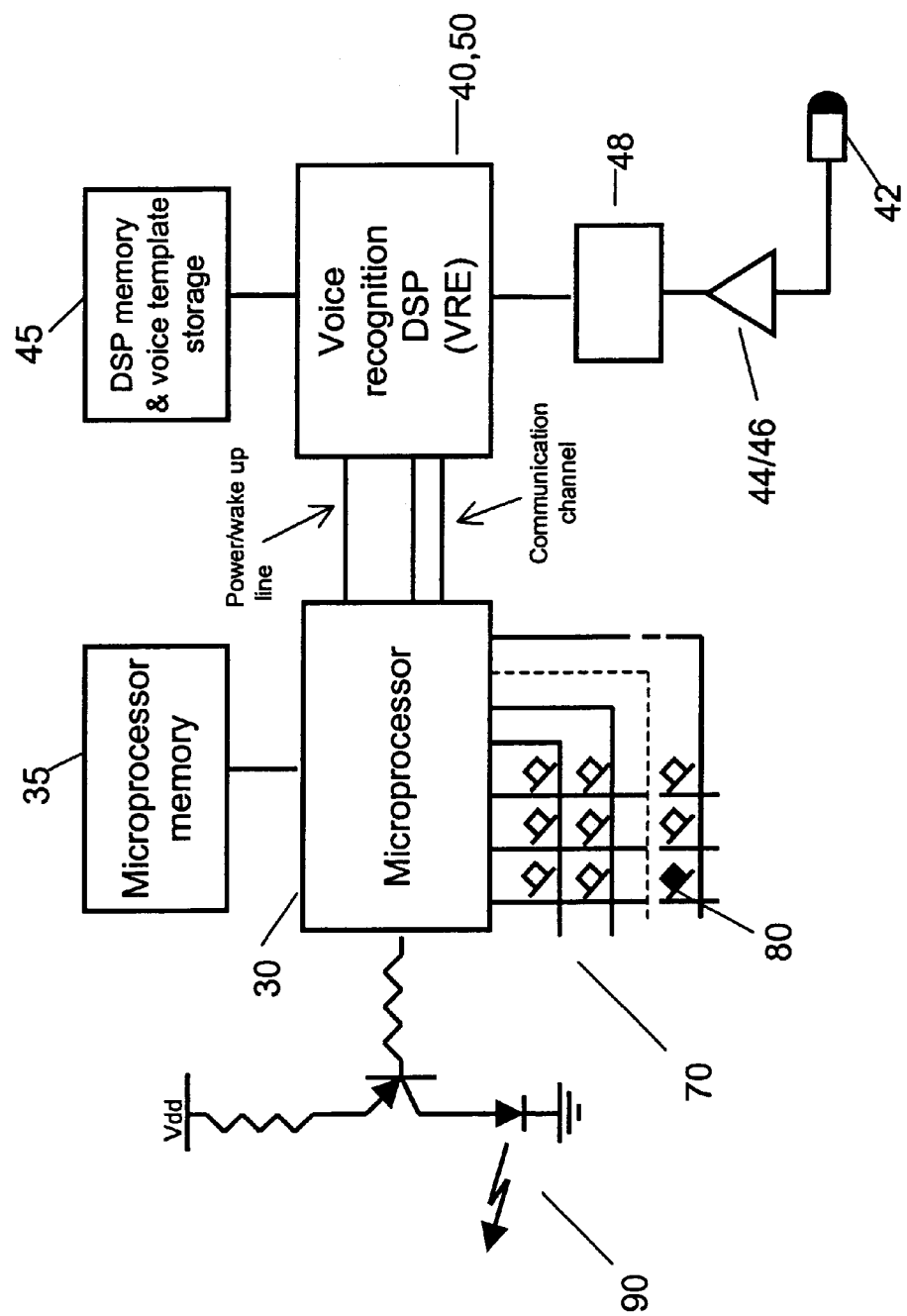
FIG. 2 shows schematic diagrams of the remote control illustrated in FIG. 1.

As shown in FIG. 2, the remote control 20 preferably includes a microprocessor 30, memories 35 an 45, and a digital signal processor 40. An arrangement of buttons 70 is coupled to the microprocessor 30 for, among other things, allowing the user 10 to command the operation of the remote control 20 in a conventional manner. The buttons 70 include number buttons 72, function buttons 74, and mode buttons 76 including a keyboard button 78, and a voice button 80. As will be described in greater detail hereinafter, the voice button 80 is provided for placing the remote control 20 in a voice activated state while the keyboard button 78 is provided for placing the remote control 20 in a keyboard mode. While described in the context of physical buttons on the remote control 20, the buttons can be implemented virtually using touch screens or the like.

The memories 35 and 45 may be comprised of any type of computer-readable media, such as ROM, RAM, SRAM, FLASH, EEPROM, or the like. Preferably these comprise non-volatile forms of memory such as ROM, Flash, or battery-backed SRAM such that programmed and user entered data is not required to be reloaded after battery changes. Furthermore, the memories 35 and 45 may take the form of a chip, a hard disk, a magnetic disk, and/or an optical disk.

For use in controlling the operation of the remote control 20, the memory 35 includes executable instructions that are intended to control the operation of the microprocessor 30. In this manner, the microprocessor 30 may be programmed to control the various electronic components within the remote control 20, e.g., to control power, to cause the transmission of signals, etc. For communicating with different types of consumer electronic devices from different manufacturers, the memory 35 also includes an operational command code library as well as an alphanumeric symbols library. The operational command code library is comprised of a plurality of operational command codes that may be transmitted from the remote control 20, in response to activation of a button or a voice input signal 52, to control the operation of a consumer electronic device. The alphanumeric symbols library contains alphanumeric symbol codes representative of keystroke data that are similarly transmitted to consumer electronic devices in response to activation of a button or a voice input signal. In connection with the stored command and alphanumeric symbol codes, the memory 35 includes instructions which the processor uses in connection with a transmission module 90 to cause the codes to be transmitted in a format recognized by identifiable consumer electronic devices. As will be appreciated by those of skill in the art, a user may enter data into the remote control 20 that serves to identify consumer electronic devices by type and manufacturer such that the remote control 20 is adapted to transmit the codes in the formats appropriate for such identified consumer electronic devices.

Within the memory 45 are stored executable instructions that are intended to control the operation of the digital signal processor 40 to implement a Voice Recognition Engine (VRE) 50. The memory 45 also stores the voice command templates that are used to determine whether a voice input signal 52 that is provided by the user 10 to the remote control 20 is a valid voice input signal. Valid voice input signals 52 are those that match one or more of the voice command templates stored in the memory 45. In this regard, the voice command templates to which the voice input signals are compared may be words and/or spoken alphanumeric symbols. It will be appreciated that the two memories 35 and 45 need not both be of the same type; advantageously memory 35 may be ROM while memory 45 may be Flash or other non-volatile read/write memory in order to allow the user of the remote to store new voice phrases (templates) for recognition. Additionally, each of these memories may themselves comprise a mixture of types, for instance either or both memories may include a small amount of RAM for use as transient, or temporary, storage during processing.

For controlling the operation of the remote control itself or one or more consumer electronic devices, the user 10 may activate one or more keys on the remote control 20. Consumer electronic devices that are especially adapted for remote control include TVs, VCRs, DVD players, thermostats, fans, entry systems, computers, and similar home appliances. Local operations that may be included with the remote control 20, such as favorite button setup, macro button setup, etc., are performed in accordance with the executable instructions that are used to control the operation of the remote control 20. As noted previously, these executable instructions may also be activated in response to voice input.

For receiving the voice input, a receiver 42, such as a microphone, is provided. The receiver 42 is linked to the digital signal processor 40 which is coupled to the microprocessor 30. The voice input, which is initially received as an analog signal, is converted to a digital signal whereby it may be compared against the voice command templates stored in the memory 45. The A/D conversion of the voice signal may be performed in accordance with known principles using an amplifier 44 and filter 46 (for enhancing the voice input signal 52 by increasing the strength of the signal and removing any noise) in connection with a standard analog to digital converter 48. The digitized voice input signal is then processed by the voice recognition engine (VRE) 50, a set of programming instructions for the DSP 40 which compare the voice input signal with the voice command templates stored in the memory 45.

For use in comparing the voice input signal with the voice command templates stored in the memory 45, the voice recognition engine 50 may be provided with a comprehensive word recognition capability. In accordance with a comprehensive word recognition capability, the voice recognition engine 50 will parse whole words said by the user, for example, "www," "dot," "yahoo," "dot," "com," into individual alphanumeric symbols. Alternatively, the remote control may utilize a less expensive, low-level version of the voice recognition engine 50 that is only programmed to identify alphanumeric symbols. In this case, the recognition engine simply operates on the individual sounds said by the user, thus requiring the user to spell out each word one character at a time, for example, "w," "w," "w," "dot," "y," "a," "h," "o," "o," "dot," "c," "o," "m."

To access the voice recognition capabilities of the remote control 20, as shown in FIGS. 5a–5d, the user 10 activates the voice button 80 to place the remote control in a voice activated state. Once the voice button 80 is activated or depressed, the microprocessor 30 powers up the digital signal processor 40, activates the voice recognition engine 50, and initializes the receiver 42. After the voice recognition engine 50 is activated and the receiver 42 is initialized, the voice recognition engine 50 waits for a voice input signal 52.

When not in the voice activated state, the remote control 20 preferably monitors the device mode status as set by the most recent user activation of one of the mode buttons 76, 78. If the mode is not "keyboard" (i.e., one of the device type mode buttons 76 was last activated) the remote control 20 is in a mode whereby the command buttons of the remote control are used to command the operation of consumer electronic devices 22 in a conventional manner. If, however, the keyboard mode button 78 was the last mode button activated, the remote control is in a keyboard mode whereby activation of a command button is understood to be the equivalent of entering keystroke data. For example, in the keyboard mode, activation of a number button would not cause the transmission of an operational change channel command to the consumer electronic devices as would be conventional. Rather, the activation of a number button would cause the remote control to transmit a formatted alphanumeric symbol code corresponding to the number button activated. This is particularly advantageous since it allows a security conscious user to input keystroke data (e.g., a credit card number) without having to speak it aloud.

When the remote control 20 is in the voice activated state and the voice recognition engine 50 is waiting for a voice-input signal 52, the microprocessor 30 also preferably checks to see if the voice button 80 has been deactivated. If the voice button 80 has been deactivated, the microprocessor 30 should issue a stop command to the digital signal processor 40. Once the digital signal processor 40 acknowledges receipt of the stop command, the microprocessor 30 should power down the digital signal processor 40. The microprocessor 30 should also check to see if the digital signal processor 40 has timed out, i.e., if a specified period of time has passed without a response or voice-input signal 52 from a user 10. If the digital signal processor 40 has timed out, the microprocessor 30 should again issue a stop command to the digital signal processor.

To ensure that the remote control 20 accurately receives voice input signals 52 from the user 10, the microprocessor 30 may check for the existence of an error condition, e.g., insufficient amplitude for the voice-input signal 52, excessive background noise or the like. If an error condition exists, the microprocessor 30 should indicate the existence of an error condition to the user by providing a beep, a flashing LED, a LCD message or similar notification means. After indicating that an error condition exists, the microprocessor 30 should also issue a stop command to the digital signal processor.

As noted previously, to determine whether a valid voice signal was received, the voice recognition engine 50 compares the digitized voice signal to the voice command templates stored in memory 45. If a match is found, then a valid voice signal has been provided to the remote control 20 and a corresponding command code (e.g., operational command code and/or alphanumeric symbol code corresponding to keystroke data) may be transmitted to the consumer electronic device 22 using the coding format recognizable by the consumer electronic device 22.

Taking the case of a voice recognition engine having a comprehensive word recognition capability, the voice recognition engine 50 may determine whether a word or character has been provided. For example, the voice recognition engine 50 may first compare the digitized voice signal to voice command templates that are also in the form of complete words. If the digitized voice signal is recognized as, i.e., matches, a voice command template, then the voice signal is determined to be a valid voice signal and the voice recognition engine 50 sends a signal to the microprocessor 30 indicating that a valid word has been received.

If the digital input signal is not a complete word, the voice recognition engine 50 compares the digitized voice signal to voice command templates that are stored in the form of alphanumeric symbols. If the voice signal is recognized as, i.e., matches, a voice command template, then the digitized voice signal is valid. In response to the receipt of one or more valid alphanumeric voice commands, the voice recognition engine 50 sends a signal to the microprocessor 30 indicating that a valid alphanumeric symbol was received.

Figure 5A:
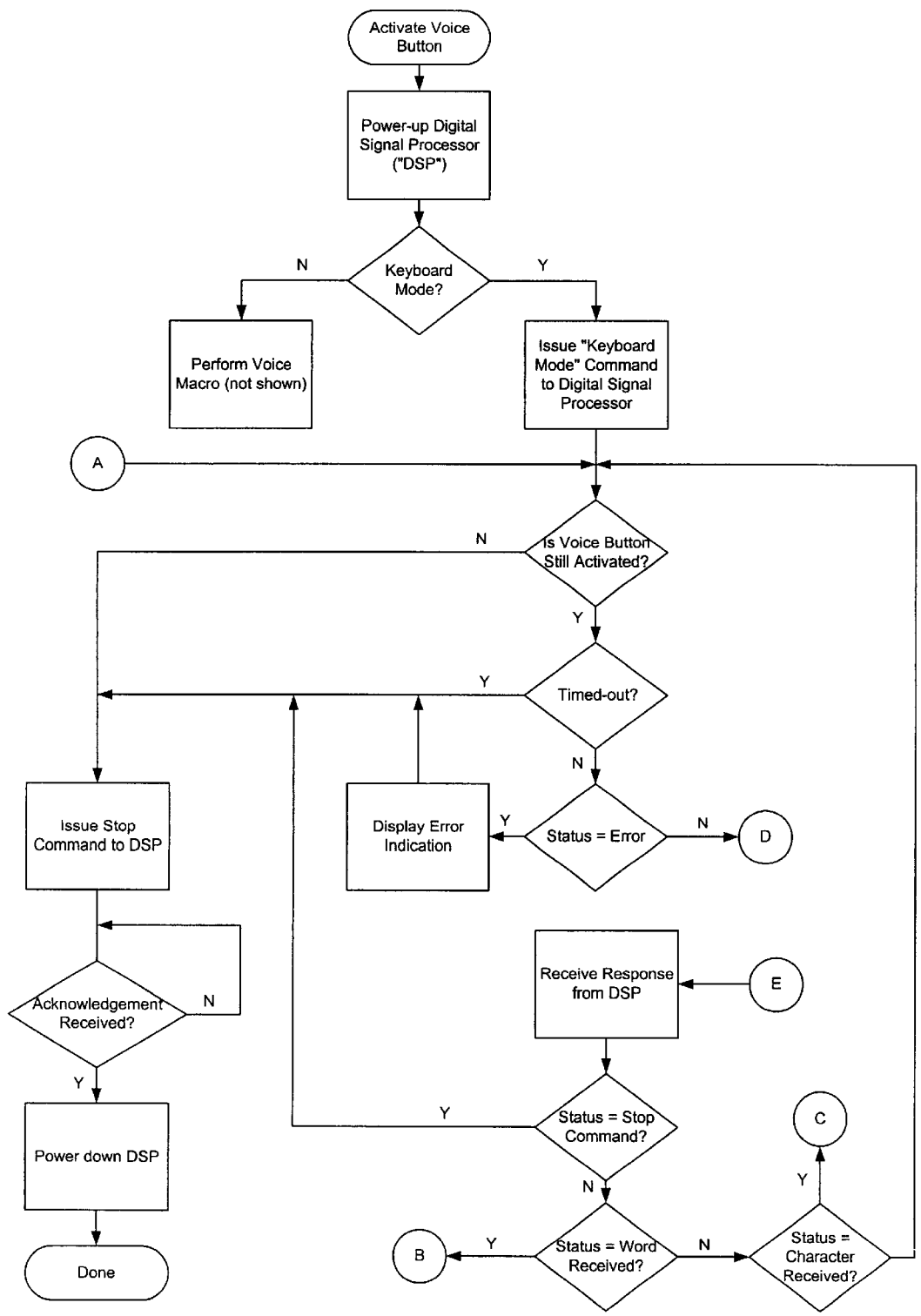
FIGS. 5a–5d show flow chart diagrams of an exemplary method by which the remote control of FIG. 1 can transmit command codes, including keystroke data, to a remotely controlled device.
Figure 5B:
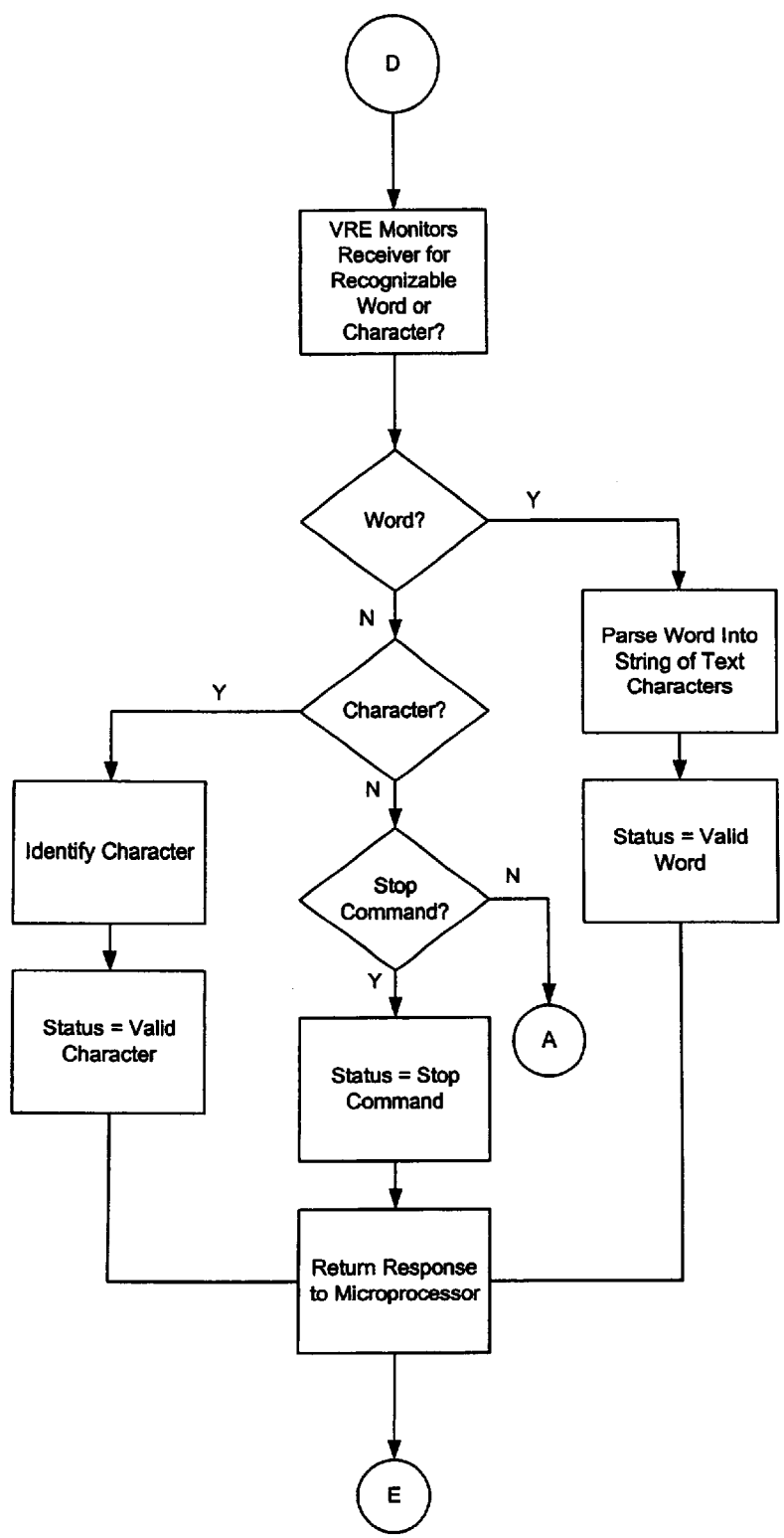
Figure 5C:
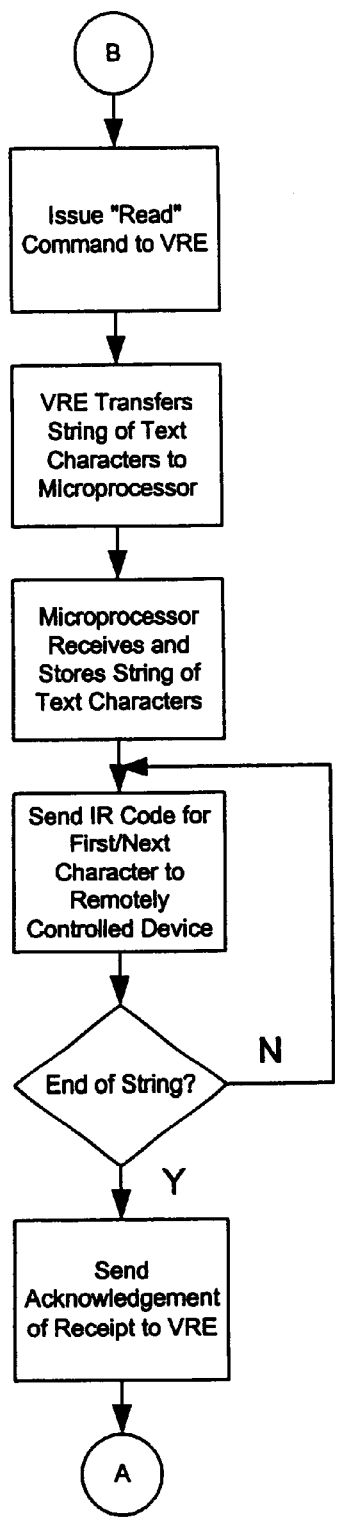

If the microprocessor 30 receives a response indicating that a valid word was received, then the steps shown in FIG. 5c may be executed. In the example illustrated, the microprocessor 30 issues a "read" command to the voice recognition engine 50. When the "read" command is received by the voice recognition engine 50, the voice recognition engine 50 sends signals indicative of the parsed voice input (i.e., signals indicative of a string of alphanumeric symbols 64) to the microprocessor 30. The microprocessor uses the signal from the voice recognition engine 50 to access the memory 34 to look-up the information/instructions needed to cause the transmission module 90 to send an alphanumeric symbol code corresponding to each alphanumeric symbol in the voice input in the appropriate format for the intended consumer electronic device 22. Once all of the alphanumeric symbols have been transmitted to the consumer electronic device 22, the microprocessor 30 sends an acknowledgement to the voice recognition engine 50. In this manner, if the user speaks the words "www," "dot," "yahoo," "dot," "com," the remote control 20 will transmit the equivalent of each alphanumeric symbol included in the word sequence to the consumer electronic device 22 in the format recognized by the consumer electronic device 22.

Figure 5D:
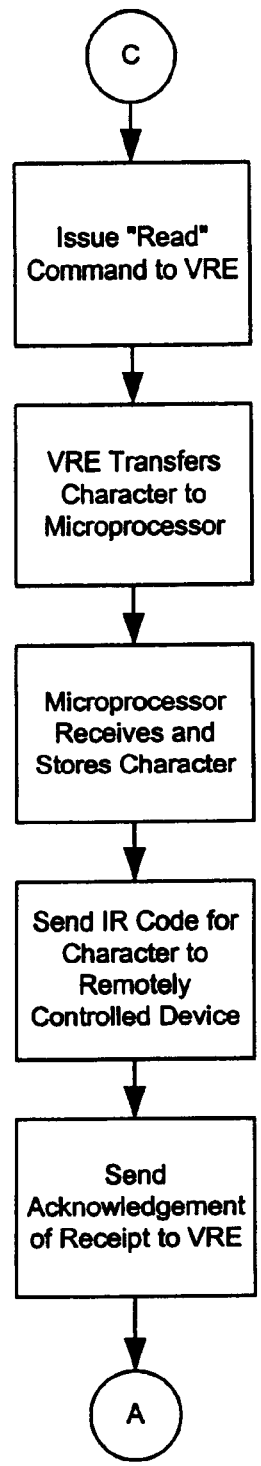

If the microprocessor 30 receives a response indicating that a valid alphanumeric symbol was received, then the steps shown in FIG. 5d may be executed. In the illustrated example, the microprocessor 30 issues a "read" command to the voice recognition engine 50. In response to the "read" command, the voice recognition engine 50 sends a signal indicative of the alphanumeric voice input to the microprocessor 30 and the microprocessor 30 uses the signal to cause the transmission module to send the formatted alphanumeric symbol code corresponding to the voice input to the intended consumer electronic device 22. Once the alphanumeric symbol code is sent, the microprocessor 30 will send an acknowledgement to the voice recognition engine 50. This is repeated for each alphanumeric symbol the user inputs by voice. In this manner, if the user speaks the alphanumeric sounds "w," "w," "w," "dot," "y," "a," "h," "o," "o," "dot," "c," "o," "m," the remote control 20 will transmit the equivalent of each of the alphanumeric symbols included in the sequence to the consumer electronic device 22 in the format recognized by the consumer electronic device 22.

Still further, the voice recognition engine can use the spoken words and/or alphanumeric sounds to cause the remote control 10 to transmit operational command codes to the consumer electronic devices. The user 10 can utter certain pre-programmed phrases which will cause the voice recognition engine to direct the microprocessor to initiate the transmission of a corresponding operational command code to the consumer electronic devices in formats appropriate for the consumer electronic devices. For example, in response to the user uttering the letters "E," "S," "P," and "N," the remote control 20 can be adapted to transmit one or more operational command codes to an identified cable box that causes the cable box to tune the attached television to the channel carrying "ESPN."

The order of all steps disclosed in the figures and discussed above has been provided for exemplary purposes only. Therefore, it should be understood by those skilled in the art that these steps may be rearranged and altered without departing from the spirit of the present invention. In addition, it is to be understood that all patents discussed in this document are to be incorporated herein by reference in their entirety.

While specific embodiments of the present invention have been described in detail, it will be appreciated by those skilled in the art that various modifications and alternatives to those details could be developed in light of the overall teachings of the disclosure. For example, the processes described with respect to computer executable instructions can be performed in hardware or software without departing from the spirit of the invention. Accordingly, the particular arrangement disclosed is meant to be illustrative only and not limiting as to the scope of the invention which is to be given the full breadth of the appended claims and any equivalents thereof.

What is claimed is:

1. In a remote control having a plurality of buttons each being activatable to enter button input, a microphone for receiving voice input, and a memory in which is stored a plurality of command codes for commanding the operation of consumer electronic devices and a plurality of alphanumeric symbol codes, a method for transmitting signals to a consumer electronic device representative of an input to the remote control comprising:

determining if the input is a voice input or a button input;
      when the input is a voice input, determining if the remote control is in a first mode or a second mode;
      when the remote control is in the first mode, selecting at least one alphanumeric symbol code from the plurality of alphanumeric symbol codes stored in the memory as a function of the voice input and transmitting a signal to the consumer electronic device comprising the selected alphanumeric symbol codes to support network communication functions;
      when the remote control is in the second mode, selecting at least one command code from the plurality of command codes stored in the memory as a function of the voice input and transmitting a signal to the consumer electronic device comprising the selected command codes to cause the consumer electronic device to perform an operation;
      when the input is button input, selecting at least one command code from the plurality of command codes stored in the memory as a function of the button or buttons activated and transmitting a signal to the consumer electronic device comprising the selected command codes to cause the consumer electronic device to perform an operation.

2. The method as recited in claim 1, wherein the plurality of buttons includes a keyboard button for placing the remote control in a third mode and, when the remote control is placed in the third mode, the method comprises selecting at least one alphanumeric symbol code from the plurality of alphanumeric symbol codes stored in memory as a function of the button or buttons activated in lieu of the step of selecting at least one command code from the plurality of command codes stored in the memory as a function of the button or buttons activated and transmitting a signal to the consumer electronic device comprising the selected alphanumeric symbol codes to support network communication functions.

3. The method as recited in claim 1, wherein the plurality of buttons includes a voice button for placing the remote control in a condition for receiving voice input.

4. A readable media having instructions for commanding the operation remote control having a plurality of buttons each being activatable to enter button input, a microphone for receiving voice input, and a memory in which is stored a plurality of command codes for commanding the operation of consumer electronic devices and a plurality of alphanumeric symbol codes, the instructions performing steps comprising:

determining if the input is a voice input or a button input;
      when the input is a voice input, determining if the remote control is in a first mode or a second mode;
      when the remote control is in the first mode, selecting at least one alphanumeric symbol code from the plurality of alphanumeric symbol codes stored in the memory as a function of the voice input and transmitting a signal to the consumer electronic device comprising the selected alphanumeric symbol codes to support network communication functions;
      when the remote control is in the second mode, selecting at least one command code from the plurality of command codes stored in the memory as a function of the voice input and transmitting a signal to the consumer electronic device comprising the selected command codes to cause the consumer electronic device to perform an operation;
   when the input is button input, selecting at least one command code from the plurality of command codes stored in the memory as a function of the button or buttons activated and transmitting a signal to the consumer electronic device comprising the selected command codes to cause the consumer electronic device to perform an operation.

5. The readable media as recited in claim 4, wherein the plurality of buttons includes a keyboard button for placing the remote control in a third mode and, when the remote control is placed in the third mode, the method comprises selecting at least one alphanumeric symbol code from the plurality of alphanumeric symbol codes stored in memory as a function of the button or buttons activated in lieu of the step of selecting at least one command code from the plurality of command codes stored in the memory as a function of the button or buttons activated and transmitting a signal to the consumer electronic device comprising the selected alphanumeric codes to support network communication functions.

6. The readable media as recited in claim 4, wherein the plurality of buttons includes a voice button for placing the remote control in a condition for receiving voice input.

* * * * *